(12) United States Patent
Geng et al.

(10) Patent No.: US 11,599,246 B2
(45) Date of Patent: Mar. 7, 2023

(54) DISPLAY DEVICE AND DISPLAY METHOD THEREOF

(71) Applicant: BOE Technology Group Co., Ltd., Beijing (CN)

(72) Inventors: Lihua Geng, Beijing (CN); Xitong Ma, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/546,970

(22) Filed: Dec. 9, 2021

(65) Prior Publication Data
US 2022/0253183 A1 Aug. 11, 2022

(30) Foreign Application Priority Data
Feb. 5, 2021 (CN) .......................... 202110164334.2

(51) Int. Cl.
*G06F 3/048* (2013.01)
*G06F 3/14* (2006.01)
*G06F 3/0482* (2013.01)

(52) U.S. Cl.
CPC .......... *G06F 3/0482* (2013.01); *G06F 3/1423* (2013.01)

(58) Field of Classification Search
CPC .. G06F 3/0482; G06F 3/04817; G06F 3/0481; G06F 3/0484; G06F 3/0489; G06F 3/04845; G06F 3/04897; G06F 3/1423; G06F 3/1407; G06F 9/451; G09G 5/14; G09G 5/377; G09G 2352/00; G09G 2360/08; G09G 2370/14
See application file for complete search history.

(56) References Cited

U.S. PATENT DOCUMENTS

| | | | | |
|---|---|---|---|---|
| 5,386,247 A * | 1/1995 | Shafer | .................. | H04N 21/485 348/E5.119 |
| 6,130,659 A * | 10/2000 | Kim | ........................ | G09G 1/165 715/810 |
| 10,555,028 B2 * | 2/2020 | Cho | .................... | H04N 21/8173 |
| 10,706,238 B2 * | 7/2020 | Uratani | .................... | G06F 40/58 |
| 11,112,880 B1 * | 9/2021 | Krishnakumar | ........ | G06F 3/023 |
| 11,199,915 B2 * | 12/2021 | Guynes | ............... | G06F 3/04897 |
| 2017/0142469 A1 * | 5/2017 | Cho | .................... | H04N 21/4147 |

* cited by examiner

*Primary Examiner* — Vijay Shankar
(74) *Attorney, Agent, or Firm* — IPro, PLLC

(57) ABSTRACT

Provided is a display device. The display device includes a first processor, a second processor, and a display screen. The first processor is configured to acquire at least two OSD images, and to form a combined image with at least two OSD images and send the combined image to the second processor. The second processor is electrically coupled to the first processor and is configured to receive the combined image, identify at least two OSD images from the combined image, acquire a first screen and acquire a second screen by superimposing at least two OSD images onto the first screen, and output the second screen to the display screen. The display screen is electrically coupled to the second processor and is configured to display the second screen.

18 Claims, 7 Drawing Sheets

100

100

400

410

DISPLAY DEVICE AND DISPLAY METHOD THEREOF

CROSS-REFERENCE TO RELATED APPLICATION

This application is based on and claims priority to the Chinese Patent Application No. 202110164334.2, filed on Feb. 5, 2021 and entitled "DISPLAY DEVICE AND DISPLAY METHOD THEREOF," the disclosure of which is herein incorporated by reference in its entirety.

TECHNICAL FIELD

The present disclosure relates to the field of display technologies, and in particular relates to a display device and a display method thereof.

BACKGROUND

In some scenarios in the display field, some display devices process images by two processing units. One processing unit is configured to render some interface images and to transmit the interface images to the other processing unit for processing the interface images, for example, superimposing the interface images onto other input images.

SUMMARY

The present disclosure provides a display device and a display method thereof.

In one aspect of the present disclosure, a display device is provided. The display device includes a first processor, a second processor, and a display screen.

The first processor is configured to: acquire at least two on-screen-display (OSD) images; and form a combined image with the at least two OSD images and send the combined image to the second processor.

The second processor, electrically coupled to the first processor, is configured to: receive the combined image; identify the at least two OSD images from the combined image; acquire a first screen; and superimpose the at least two OSD images onto the first screen to form a second screen and output the second screen to the display screen.

The display screen, electrically coupled to the second processor, is configured to display the second screen.

In another aspect of the present disclosure, a display method applicable to the display device is provided.

The display method includes: acquiring at least two on-screen-display (OSD) images by a first processor; forming a combined image with the at least two OSD images and send the combined image to a second processor by the first processor; identifying the at least two OSD images from the combined image by the second processor; acquiring the first screen by the second processor; acquiring a second screen by superimposing the OSD images onto the first screen by the second processor, and outputting the second screen to the display screen; and displaying the second screen on the display screen.

BRIEF DESCRIPTION OF THE DRAWINGS

For clearer descriptions of the technical solutions in the present disclosure or the related art, the following briefly introduces the accompanying drawings required for describing the embodiments or the related art. Apparently, the accompanying drawings in the following description only show some embodiments of the present disclosure, and those of ordinary skilled in the art can still derive other drawings from these accompanying drawings without creative efforts.

DETAILED DESCRIPTION

For clearer descriptions of the objectives, technical solutions, and advantages of the present disclosure, embodiments of the present disclosure are described in detail hereinafter referring to the accompanying drawings.

It should be noted that, unless otherwise defined, the technical or scientific terms used in the present disclosure should be given the ordinary meanings as understood by those with ordinary skill in the art to which this disclosure belongs. The terms "first," "second," and the like in the present disclosure do not indicate any order, quantity or importance, but are only used to distinguish different components. The words "include," "comprise," and derivatives thereof mean that the element or item appearing in front of the word covers the element or item listed behind the word and its equivalents, but does not exclude other elements or items. The words "coupled," "connected," and the like are not limited to physical or mechanical connections, but may include electrical connections, whether direct or indirect. The words "up," "down," "left," "right," and the like are only used to indicate the relative position relationship. When the absolute position of the described object changes, the relative position relationship may also change accordingly.

Figure 1:
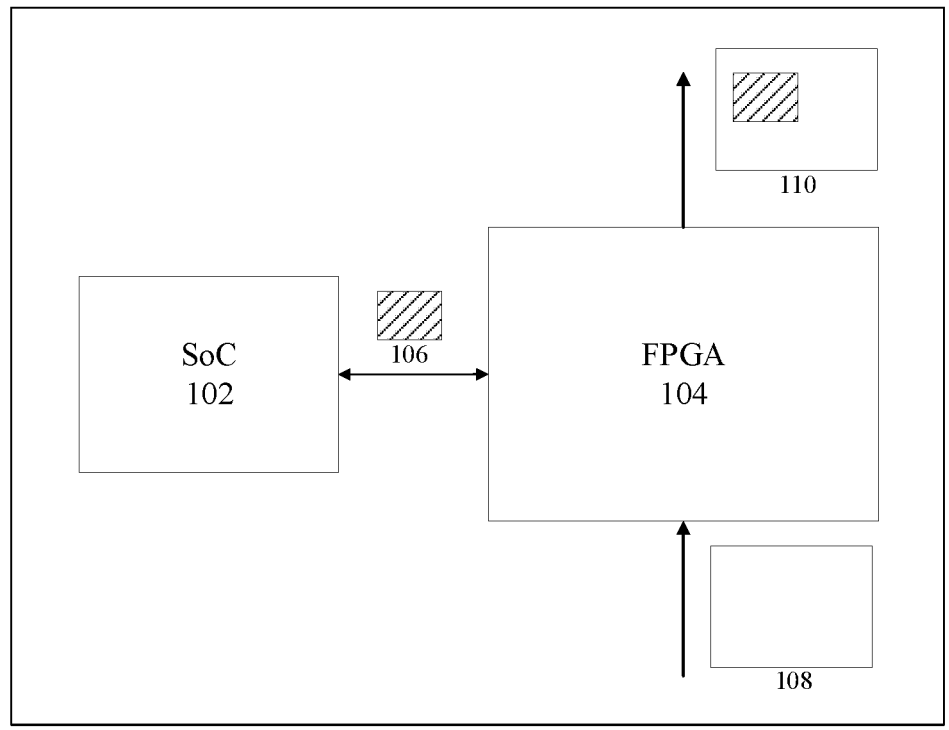
FIG. 1 illustrates a schematic diagram of a display system according to some embodiments of the present disclosure.

FIG. 1 illustrates a schematic diagram of a display system 100. The display system 100 may be an ultra-high resolution display system. As shown in FIG. 1, the display system 100 includes a system-on-chip (SoC) 102 and a field-programmable gate array (FPGA) 104. In the ultra-high resolution display system 100, the FPGA 104 is typically applicable to image input, output, and processing, the SoC 102 is applicable to rendering the User Interface(UI) of the on-screen-display (OSD) images. An OSD image 106 drawn by the SoC 102 is transmitted to the FPGA 104 through the Low-Voltage Differential Signaling(LVDS) or other video interfaces. The FPGA 104 acquires an output image 110 by superimposing the OSD image 106 onto an input image 108, and then outputs the output image 110 to a display screen (not shown) for display.

The above example describes the single OSD image 106, e.g., a menu interface, transmitted from the SoC 102 to the FPGA 104. However, for more complex display systems, a plurality of user interface display may be required. For example, for the display system 100 of a monitor, a plurality of interfaces, such as menus, formats of input signals, monitoring function background and the like may be required.

Figure 2:
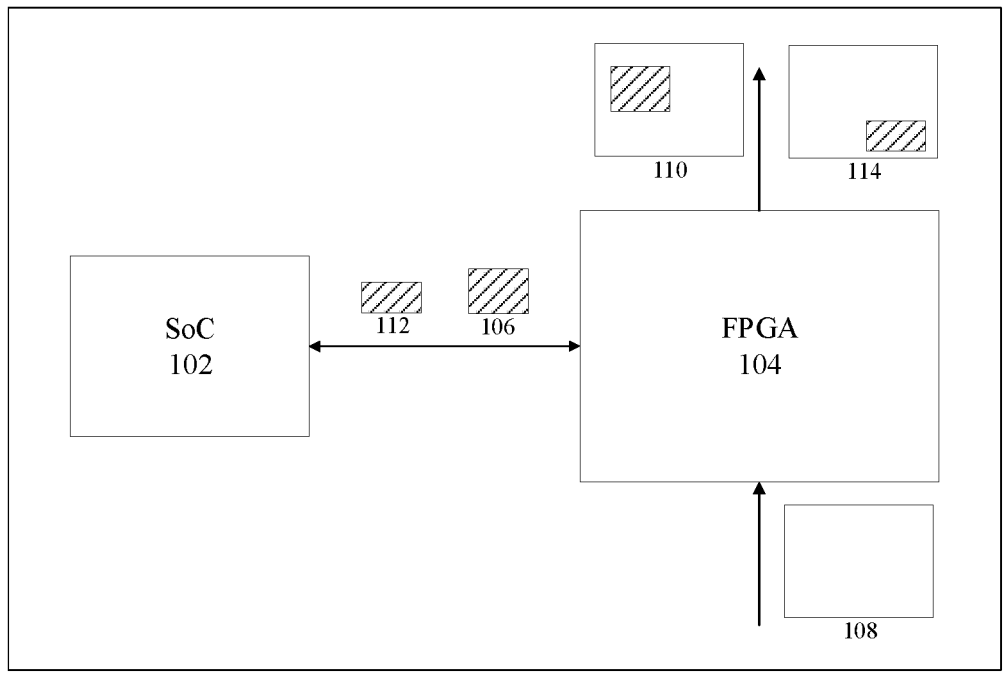
FIG. 2 illustrates a schematic diagram of another display system according to some embodiments of the present disclosure.
Figure 3:
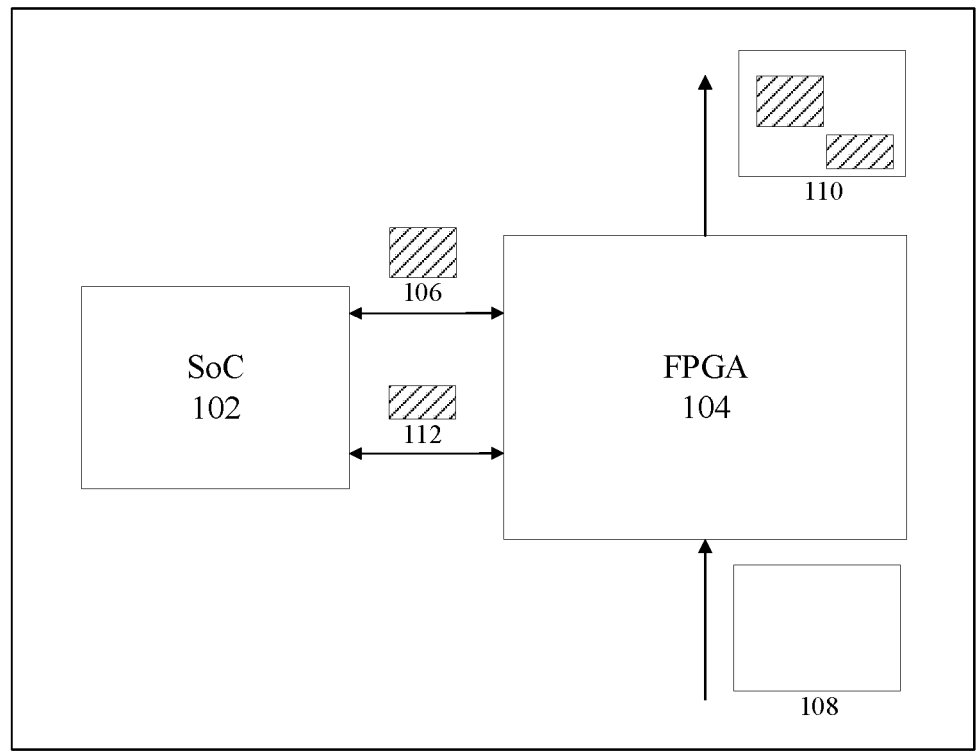
FIG. 3 illustrates a schematic diagram of still another display system according to some embodiments of the present disclosure.

For the transmission of a plurality of OSD images, two processing methods in FIG. 2 and FIG. 3 are generally provided.

FIG. 2 illustrates a schematic diagram of another display system 100. As shown in FIG. 2, the display system 100 employs a single-channel time-sharing display. That is, only one image transmission channel is provided between the SoC 102 and the FPGA 104, and different OSD images need to be transmitted at different time nodes. For example, the OSD image 106 is transmitted at a time node 1, and the FPGA 104 outputs the image 110 in the case that the OSD image 106 is superimposed onto the input image 108; and the OSD image 112 is transmitted at a time node 2, and the FPGA 104 outputs the image 114 in the case that the OSD image 112 is superimposed onto the input image 108.

It can be noted that the disadvantage of the display method is that two or more OSD images cannot be transmitted at the same time node, resulting in lower transmission efficiency. The display method also fails to display more than two OSD images at the same time node, which leads to a poor experience for the user.

FIG. 3 illustrates a schematic diagram of still another display system 100. As shown in FIG. 3, the display system 100 employs a plurality of channels for simultaneous transmission of OSD images. For example, two image transmission channels are provided between the SoC 102 and the FPGA 104, and two OSD images, for example, the OSD image 106 and the OSD image 112, may be transmitted at the same time node.

However, the disadvantage of the display method is obvious. Two transmission channels need to be set, in the case that two OSD images are transmitted simultaneously. In the case that three or more OSD images need to be transmitted, a number of transmission channels corresponding to the OSD images need to be set. As a result, excessive hardware resources need to be used to display a plurality of OSD images simultaneously.

In view of this, an embodiment of the present disclosure provides a display device. The display device includes a first processor, a second processor, and a display screen. The first processor is configured to acquire at least two OSD images, form a combined image with the at least two OSD images and send the combined image to the second processor. The second processor is electrically coupled to the first processor. The second processor is configured to receive the combined image, identify the at least two OSD images from the combined image, acquire a first screen, acquire a second screen by superimposing the at least two OSD images onto the first screen, and output the second screen to the display screen. The display screen is electrically coupled to the second processor and is configured to display the second screen.

In the display device according to the embodiment of the present disclosure, the first processor is configured to acquire the combined image by combining the at least two OSD images, send the combined image to the second processor, acquire the at least two OSD images by identifying the combined image by the second processor, and acquire a second screen by superimposing the at least two OSD images onto the first screen and output the second screen. In this way, a second screen with the at least two OSD images superimposed may be acquired by sending a combined image including the at least two OSD images to the second processor via one transmission channel, such that the at least two OSD images can be superimposed and displayed at the same time node without adding hardware resources (for example, transmission channels).

Figure 4:
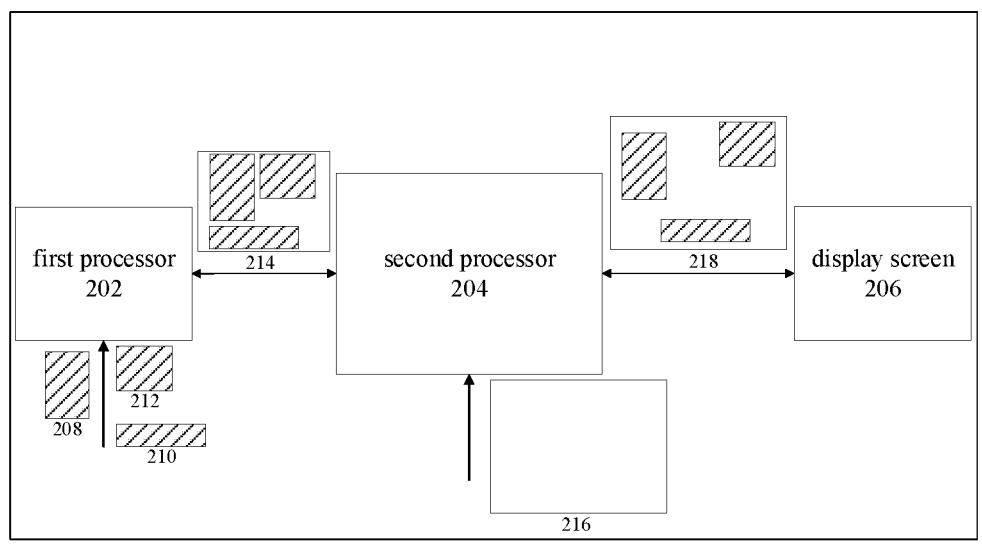
FIG. 4 illustrates a schematic diagram of a display device according to some embodiments of the present disclosure.

FIG. 4 illustrates a schematic diagram of a display device 200 according to the embodiments of the present disclosure. As shown in FIG. 4, the display device 200 may include a first processor 202, a second processor 204, and a display screen 206. The first processor 202, which may be, for example, an SoC or an advanced reduced instruction set computer (RISC) machine processor, is configured to render OSD images. The second processor 204, which may be, for example, an FPGA, is configured to process the OSD images, for example, superimposing the OSD images onto the input image. The second processor 204 may be electrically coupled to the first processor 202 and the display screen 206, for example, and in a wired or wireless fashion. In some embodiments, the first processor 202 and the second processor 204 may be electrically coupled via an interface such as LVDS, and the second processor 204 and the display 206 may be electrically coupled via an interface such as v-by-one (VBO).

In some embodiments, the second processor 204 may be electrically coupled to an external device (for example, a camera) through a high-definition multimedia interface (HDMI) or serial digital interface (SDI) or the like for receiving an input image (for example, image 216 captured by a camera) from an external device.

As shown in FIG. 4, the first processor 202 may acquire at least two OSD images (for example, images 208, 210, and 212) and form a combined image 214 with the OSD images. Then the first processor 202 may send the combined image 214 to the second processor 204. The OSD images configured to form the combined image 214 may be stored in a memory (not shown) of the display device 200 from which the first processor 202 may acquire the OSD images corresponding to the combined image 214.

The positions of the OSD images on the combined image 214 may be determined according to a predetermined plan, i.e., the positions of the OSD images on the combined image 214 may be preset. Accordingly, the first processor 202 may render OSD images at the positions of the combined image 214 corresponding to the OSD images according to these plans.

In some embodiments, the first processor 202 may form the combined image in any one of the following fashions: superimposing the at least two OSD images onto regions corresponding to the OSD images on the background image to form a combined image; and replacing regions corresponding to the at least two OSD images of the background image with the at least two OSD images.

In some embodiments, the background image may be a monochromatic image, such as a white image or a black image. Alternatively, the background image may be colorless so as to be easily distinguishable from the OSD images.

In some embodiments, the first processor 202 may acquire the combined image by stitching the at least two OSD images. Exemplarily, the at least two OSD images are stitched together according to the dimensions of the at least two OSD images. For example, the dimensions of the at least two OSD images are uniformly processed, such that each of the OSD images is in the identical dimension and is not smaller than the largest OSD image of the at least two OSD images. Then the at least two unified processed OSD images are stitched together sequentially. The fashion of uniform processing includes, but is not limited to, padding the periphery of each of the OSD images with invalid pixels (e.g., white or black pixels) until a uniform dimension is reached.

In some embodiments, the first processor 202 may set a mark on the combined image 214 to identify the OSD images such that the second processor 204 may identify the OSD images from the combined image 214 according to the mark. For example, the mark is recorded in the first row of pixels of the combined image 214, and the mark may include the position information of the OSD images on the combined image 214 and the target position information of the OSD images on the first screen 216. For another example, the mark may be set near each of the OSD images in the combined image 214. In the case that the mark is identified, the information corresponding to the OSD images in the mark is associated with the nearest OSD image, and the mark may also include both the position information of the OSD images on the combined image 214 and the target position information on the first screen 216. It should be understood that the foregoing is only an example of the mark, and other fashions of marking can also be implemented based on the same inventive concept.

In some embodiments of the present disclosure, the pixels corresponding to the marks may be referred to as target pixels.

In some embodiments, as shown in FIG. 4, each of the OSD images does not overlap with each other on the combined image 214, such that the second processor 204 better identifies the OSD images from the combined image 214.

The second processor 204 may receive the combined image 214 and may identify the OSD images from the combined image 214. Then, upon identification of the OSD images, the second processor 204 may acquire the first screen 216 from the external device, and acquire the second screen 218 by superimposing the OSD images onto the first screen 216, and outputs the second screen 218 to the display screen 206 for display. The first screen 216 may be, for example, a screen (for example, live broadcast screen) of the display device 200 captured and transmitted by an indoor or outdoor high definition camera or an ultra-high definition camera, and the OSD images superimposed onto the first screen 216 may be various interface images, such as menus, formats of input signals, monitoring function background, and the like.

In this way, the first processor 202 of the display device 200 may integrate more than two OSD images into one combined image, such that the first processor 202 may transmit more than two OSD images to the second processor 204 at one time by the combined images. The second processor 204 identifies the combined image and acquires the corresponding OSD images, and then acquire the second screen for display by superimposing the OSD images onto the first screen, such that the hardware resources (for example, increasing the transmission channel) are not required to be added in the solution of the embodiments and the at least two OSD images can be superimposed and displayed at the same time node.

In some embodiments, the first processor 202 may determine the position of each of the OSD images on the combined image and on the first screen, and then mark the corresponding position information on the target pixel (for example, the target row) of the combined image, such that the second processor 204 determines, in response to receiving the combined image, the position of each of the OSD images on the combined image and on the first screen according to the position information.

Figure 5:
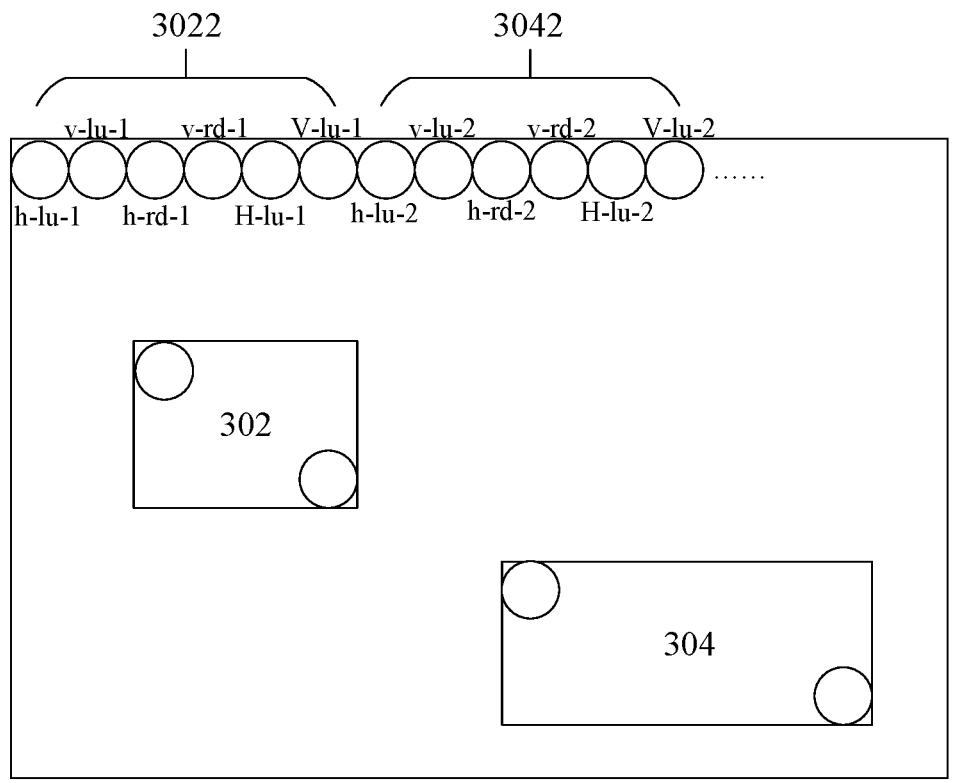
FIG. 5 illustrates a schematic diagram of an image according to some embodiments of the present disclosure.

FIG. 5 illustrates a schematic diagram of an image 300 according to some embodiments of the present disclosure. For clarity of presentation, pixels are shown in circles in FIG. 5. For example, the combined image 300 may include an OSD region 302 and an OSD region 304 with the OSD image rendered. Marks corresponding to the OSD region 302 and the OSD region 304 may also be set on the combined image 300 to indicate the position information of the OSD region 302 and the position information of the OSD region 304 on the combined image 300 (also the position information of the OSD image on the combined image 300). For example, as shown in FIG. 5, the combined image 300 may include position information 3022 corresponding to the OSD region 302 and position information 3042 corresponding to the OSD region 304.

In some embodiments, as shown in FIG. 5, the position information 3022 and the position information 3042 may be marked in the first row of pixels of the combined image 300. Accordingly, the second processor 204 may acquire the position information by reading the first row of pixels of the combined image 300 to determine the position of each of the OSD images on the combined image 300 and the first screen 310 (shown in FIG. 7).

In some embodiments, both the position information 3022 and the position information 3042 may include the first information and the second information.

The first information may be configured to indicate the position of the OSD images on the combined image 300 (that is, the position of the corresponding rendering region (OSD region) of the OSD image). For example, the first information may include abscissa information and ordinate information of two diagonal vertices of each of the OSD images on the combined image 300, wherein the abscissa information and the ordinate information of the two vertices may be represented by pixel data (for example, color component values, i.e., RGB values) of four pixels of the target row (for example, the first row of pixels) of the combined image 300. For example, as shown in FIG. 5, the pixel data of the pixels h-1$u$-1, v-1$u$-1, h-rd-1, and vs-rd-1 represents the first information of the position information 3022, which indicate the abscissa information and ordinate information of the upper left vertex and the lower right vertex of the combined image 300 on the OSD image (or OSD region 302).

Figure 7:
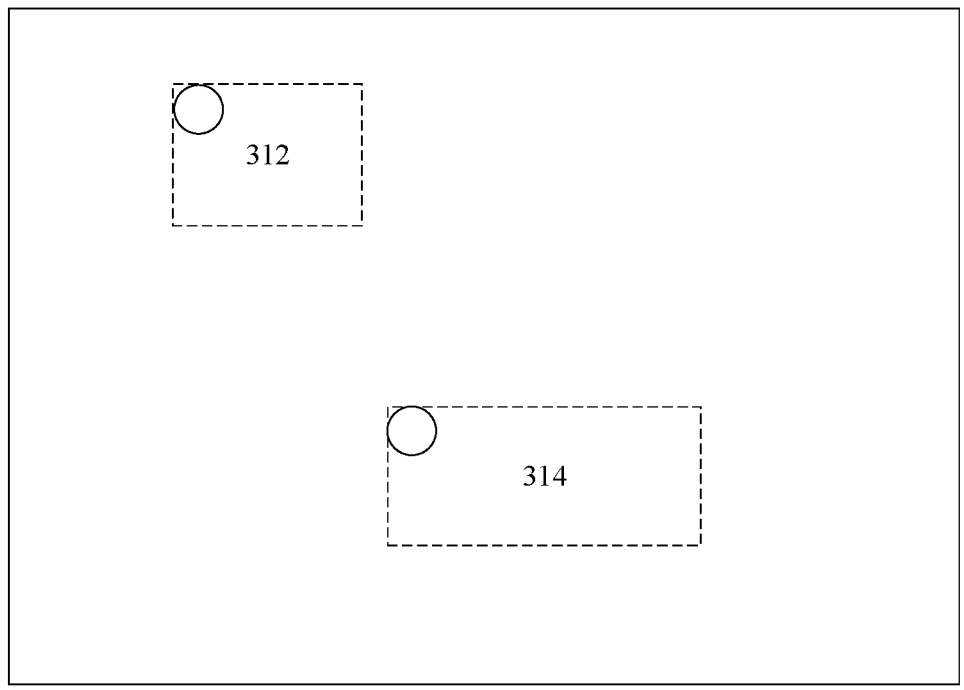
FIG. 7 illustrates a schematic diagram of another image according to some embodiments of the present disclosure.

The second information may be configured to indicate the position of the OSD images on the first screen 310 (as shown in FIG. 7) (that is, where the OSD images are superimposed onto the first screen). For example, the second information may include abscissa information and ordinate information of vertices of each of the OSD images on the first screen 310, wherein the abscissa information and the ordinate information of the vertices may be represented by pixel data of two pixels of the target row (for example, the first row of pixels) of the combined image 300. For example, as shown in FIG.

5, the pixel data of the pixels H-1u-1 and the pixel data of V-1u-1 represent the second information in the position information 3022 and indicate the abscissa information and the ordinate information of the upper left vertices of each of the OSD images (or OSD region 304) on the first screen 310.

In other words, in the first row of pixels of the combined image 300, every 6 pixels are arranged in a group, and a group of pixel data indicates the position information of an OSD image. In order to acquire the position information earlier, as shown in FIG. 5, the position information can be arranged in sequence starting from the first pixel of the first row of pixels of the combined image 300.

Figure 6:
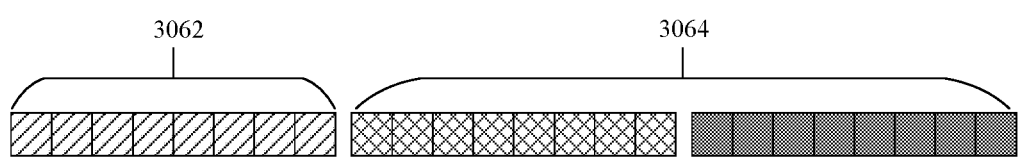
FIG. 6 illustrates a schematic diagram of pixel data according to some embodiments of the present disclosure.

FIG. 6 illustrates a schematic diagram of exemplary pixel data 306 according to some embodiments of the present disclosure. As shown in FIG. 6, in some embodiments, the pixel data of each pixel may include three color components (for example, a red component, a green component, and a blue component). For example, each of the color components may include 8 bits of data. In view of this, in some embodiments, the three data that represents the color component values of the pixel may be configured to represent some information.

As shown in FIG. 6, the 8-bit data representing the value of the color component of the first color component 3062 (for example, red component) is configured to indicate whether the pixel data contains available position information (that is, whether the pixel is configured to represent the position information of the OSD region). In the case that the 8-bit data is 0, the pixel does not contain available position information. In the case that the 8-bit data is not 0, the pixel contains available position information.

The 16-bit data representing the values of the color components of the second color component (for example, green component) and the third color component (for example, blue component) are configured to collectively represent coordinate information 3064 for indicating abscissa information or ordinate information in the position information. This is because the resolution is generally 1920×1080 for high definition screens and 3840×2160 for ultra-high definition screens. Therefore, the abscissa or ordinate value of a pixel may be greater than 255, and the 8-bit data of one color component is insufficient to represent the abscissa or ordinate value of one pixel. Thus, the embodiments of presents disclosure employ two color component values to collectively represent an abscissa value or an ordinate value for one pixel. For example, the abscissa or ordinate value may be 16-bit data consisting of a green component and a blue component, wherein the 8 bits of the green component represent the high level and the 8 bits of the blue component represent the low level, such that the abscissa value or ordinate value is collectively represented, as shown in FIG. 6.

For example, the pixels h-1u-1, v-1u-1, h-rd-1, v-rd-1, H-1u-1, V-1u-1 in FIG. 5 can collectively represent the position information 3022.

In the case that the first color component 3062 of the pixel h-1u-1 is 1 and the coordinate information 3064 is 10, the pixel indicates that the abscissa of the upper left vertex of the region 302 on the combined image 300 is 10, that is, the horizontal position of the upper left pixel of the region 302 on the combined image 300 is the 10th horizontal pixel.

In the case that the first color component 3062 of the pixel v-1u-1 is 1 and the coordinate information 3064 is 20, the pixel indicates that the vertical coordinate of the upper left vertex of the region 302 on the combined image 300 is 20, that is, the vertical position of the upper left pixel of the region 302 on the combined image 300 is the 20th vertical pixel.

In the case that the first color component 3062 of the pixel h-rd-1 is 1 and the coordinate information 3064 is 160, the pixel indicates that the abscissa of the lower right vertex of the region 302 on the combined image 300 is 160, that is, the horizontal position of the lower right pixel of the region 302 on the combined image 300 is the horizontal 160th pixel.

In the case that the first color component 3062 of the pixel v-rd-1 is 1 and the coordinate information 3064 is 90, the pixel indicates that the vertical coordinate of the lower right vertex of the region 302 on the combined image 300 is 90, that is, the vertical position of the lower right pixel of the region 302 on the combined image 300 is the vertical 90th pixel In the case that the first color component 3062 of the pixel H-1u-1 is 1 and the coordinate information 3064 is 300, the pixel indicates that the abscissa of the upper left vertex of the OSD image corresponding to the region 302 on the first screen 310 is 300, that is, the horizontal position of the upper left pixel of the OSD image corresponding to region 302 on the first screen 310 is the 300th horizontal pixel.

In the case that the first color component 3062 of the pixel V-1u-1 is 1 and the coordinate information 3064 is 200, the pixel indicates that the vertical coordinate of the upper left vertex of the OSD image corresponding to the region 302 on the first screen 310 is 200, that is, the vertical position of the upper left pixel of the OSD image corresponding to region 302 on the first screen 310 is the 200th vertical pixel.

Similarly, pixels h-1u-2, v-1u-2, h-rd-2, v-r-2, H-1u-2, V-1u-2 can collectively represent the position information 3042.

In this way, the abscissa and ordinate information corresponding to the two diagonal vertices may indicate the positions of the OSD regions on the combined image 300, and the dimension of the OSD region can be calculated according to the position. Taking the above embodiments as an example, the dimension of region 302 may be (160−10)×(90−20)=150×70.

In response to receiving the combined image 300 marked with position information, the second processor 204 may read the position information from the combined image 300, and identify each of the OSD images from the combined image 300 according to the position information.

For example, the second processor 204 may read the position information 3022 and 3042 by reading the pixel data of the first row of the combined image 300. According to the first information in the position information 3022, the second processor 204 may acquire the abscissa (corresponding to the data of the pixel h-1u-1) and the ordinate (corresponding to the pixel v-1u-1 data) of the upper left vertex and the abscissa (corresponding to the data of pixel h-rd-1) and ordinate (corresponding to the data of pixel v-rd-1) of the vertex at the lower right corner of the OSD region 302 on the combined image 300 to determine the position and dimension of the OSD region 302 on the combined image 300.

Similarly, according to the first information in the position information 3042, the second processor 204 may acquire the abscissa (corresponding to the data of the pixel h-1u-1) and the ordinate (corresponding to the pixel v-1u-1 data) of the upper left vertex and the abscissa (corresponding to the data of pixel h-rd-1) and ordinate (corresponding to the data of pixel v-rd-1) of the lower right vertex of the OSD region 304 on the combined image 300 to determine the position and dimension of the OSD region 304 on the combined image 300.

In response to determining the position and dimension of each of the OSD regions, the second processor 204 may acquire the corresponding OSD images by identifying the regions.

The second processor 204 may further determine the position where the OSD image needs to be superimposed on the first screen 310 according to the position information. FIG. 7 illustrates a schematic diagram of an image 310 according to some embodiments of the present disclosure. For clarity of presentation, pixels are shown in circles in FIG. 7.

For example, the second processor 204 may acquire the abscissa (corresponding to the data of the pixel H-1$u$-1) and the ordinate (corresponding to the data of pixel V-1$u$-1) of the upper left vertex of the region 312 corresponding to each of the OSD images superimposed onto the first screen 310 according to the second information in the position information 3022. As shown in FIG. 7, the dimension of the OSD image may be derived from the first information, and the position and dimension of the region 312 on the first picture 310 may be determined.

Similarly, the second processor 204 may acquire the abscissa (corresponding to the data of the pixel H-1$u$-2) and the ordinate (corresponding to the data of pixel V-1$u$-2) of the upper left vertex of the region 314 corresponding to each of the OSD images superimposed onto the first screen 310 according to the second information in the position information 3042. As shown in FIG. 7, the dimension of the OSD image may be derived from the first information, the position and dimension of the region 314 on the first picture 310 may be determined.

In response to identifying each of the OSD images and the position to be superimposed onto the first screen 310, the second processor 204 may acquire the second screen 320 by superimposing each of the OSD images onto the corresponding the position of the first screen 310.

Figure 8:
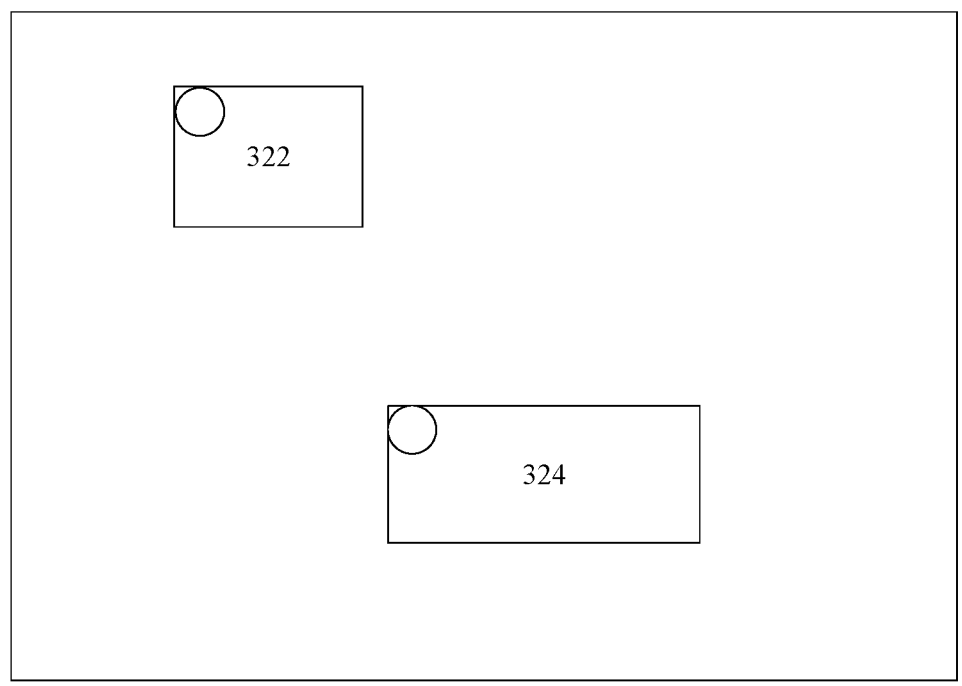
FIG. 8 illustrates a schematic diagram of still another image according to some embodiments of the present disclosure.

FIG. 8 illustrates a schematic diagram of an image 320 according to some embodiments of the present disclosure. For clarity of presentation, pixels are shown in circles in FIG. 8.

As shown in FIG. 8, in response to identifying each of the OSD images and the position to be superimposed onto the first screen 310, the second processor 204 may superimpose the OSD image 322 onto the region 312 of the first screen 310, and acquire the second screen 320 by superimposing the OSD image 324 onto the region 314 of the first screen 310.

Accordingly, the process of assembling, transmitting, and superimposing the OSD images is completed.

It should be noted that in the embodiment shown in FIG. 5, the position information on the combined image 300 may include the first information and the second information, and in other embodiments, the position information on the combined image 300 may also include the first information but not include the second information. The second processor 204 may determine the position where each of the OSD images is superimposed onto the first screen 310 according to the first information, such as directly following the first information as the position where each of the OSD images is superimposed onto the first screen 310.

In some embodiments, another fashion may be employed to transmit information for identifying the OSD images to the second processor 204.

For example, the first processor 202 may acquire a training image corresponding to the combined image and send the training image to a second processor, wherein the training image includes color patch regions corresponding to the OSD images.

Figure 9:
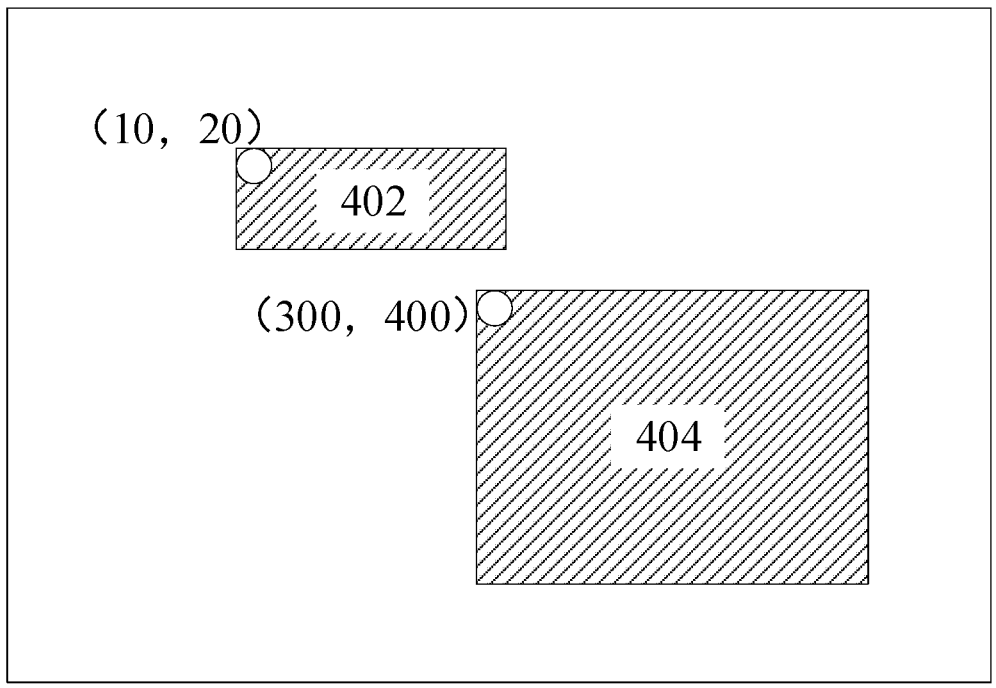
FIG. 9 illustrates a schematic diagram of a training image according to some embodiments of the present disclosure.

FIG. 9 illustrates a schematic diagram of a training image 400 according to some embodiments of the present disclosure. As shown in FIG. 9, the training image 400 may include a color patch region 402 and a color patch region 404. The color patch region 402 and the color patch region 404 may be configured to indicate positions of the corresponding OSD images placed on the combined image. The dimension of the color patch region 402 and the color patch region 404 are also the same as the dimension of the corresponding OSD images, such that the color patch region 402 and the color patch region 404 can be configured to realize the transmission of position information and dimension information of the OSD image on the training image 400 (to the second processor 204).

The color patch region 402 and the color patch region 404 may include any color, and the training image 400 except for the color patch region 402 and the color patch region 404 may be uncolored or white or different from the color patch region 402 and the color patch region 404. For example, color patch region 402 and color patch region 404 are blue (R=0, G=0, B=255), while the other regions of training image 400 are white. Of course, different colors may also be selected between the color patch regions, only for example herein.

In response to receiving the training image, the second processor 204 may identify the training image, and acquire the dimension of the color patch region on the training image and the position of the color patch region on the training image, thereby determining target position information of the OSD images configured to be superimposed onto the first screen on the combined image and the first screen. Meanwhile, the second processor 204 may record the target position information for subsequent identification of the combined image and superimpose the OSD images onto the first screen.

For example, as shown in FIG. 9, the training image 400 includes the color patch region 402 and the color patch region 404 which have a specific color. In response to receiving the training image 400, the second processor 204 determines the corresponding color patch region 402 and color patch region 404 by identifying the colors of the image 400, that is, the coordinate position of each of the pixels of the color patch region and the dimension of the entire color patch region (length×width). The coordinate position and dimension of the OSD image corresponding to the color patch region on the combined image are consistent with the position and dimension of the color patch region on the training image, thereby determining the coordinate position and dimension, that is, the target position information of the OSD image on the combined image.

The target position of the OSD image corresponding to the color patch region on the first screen corresponds to the position of the color patch region on the training image, for example, the target position of the OSD image corresponding to the color patch region on the first screen may directly follow the position of the color patch region on the training image.

In some embodiments, the dimension of the combined image is different from the dimension of the first screen. Thus, the position of the color patch region on the training image may be processed accordingly based on the ratio of the dimension of the combined image to the dimension of the first screen, and hence the target position of the OSD image on the first screen is acquired.

In some embodiments, the target position information includes abscissa information and ordinate information of at least one vertex of each of the OSD images on the combined image and the first screen and a length and a width of the OSD image; wherein the abscissa information and the ordinate information of the vertex on the combined image are a multiple of (in a multiplication relationship with) the abscissa information and the ordinate information on the first screen. This multiplication relationship may be calculated according to the dimension ratio of the combined image to the first screen.

Figure 10:
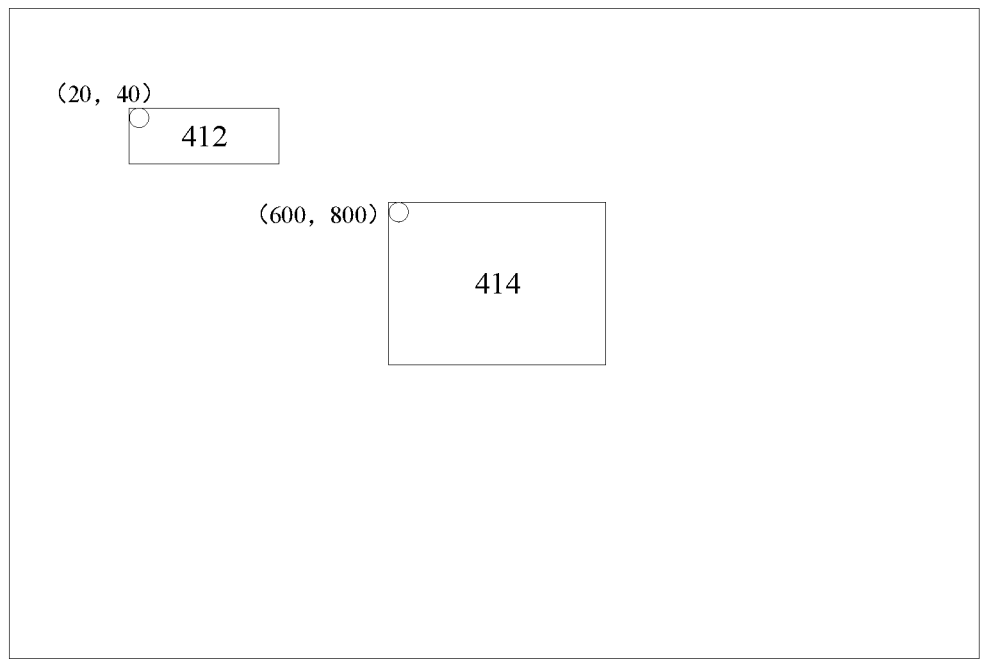
FIG. 10 illustrates a schematic diagram of another image according to some embodiments of the present disclosure.

For example, in the case that the resolution of the combined image is 1920×1080 and the resolution of the first screen is 3840×2160, the length and the width of the two are both doubled, and the position coordinates are shifted accordingly. For example, as shown in FIG. 9, the coordinates of the upper left vertex of the color patch region 402 are (10, 20), and the coordinates of the upper left vertex of the color patch region 404 are (300, 400). Accordingly, the abscissa and the ordinate of the upper left vertex of the color patch region on the first screen may be multiplied by 2. FIG. 10 illustrates a schematic diagram of an image 410 according to some embodiments of the present disclosure. As shown in FIG. 10, the region 412 and the region 414 on the image 410 are the target positions of the OSD images on the first screen, the coordinates of the upper left vertex of the region 412 are (20, 40), and the coordinates of the upper left vertex of the region 414 are (600, 800). In response to determining the coordinates of the upper left vertex, the complete OSD image may be rendered at the appropriate position according to the dimension of the color patch regions 402 and 404.

According to the above embodiments, in the case that a proportional correspondence exists between the combined image and the first screen, a corresponding relationship also exists between the positions of the OSD image on the combined image and the first screen. Based on this, according to the position of the OSD image on the first screen, the position of the OSD image on the combined image can be deduced, and then the training image can be arranged accordingly.

In response to determining the target position information of the OSD image on the combined image and the first screen according to the training image, the first processor 202 may form a combined image with the OSD images according to the target position information of the OSD image on the combined image.

Figure 11:
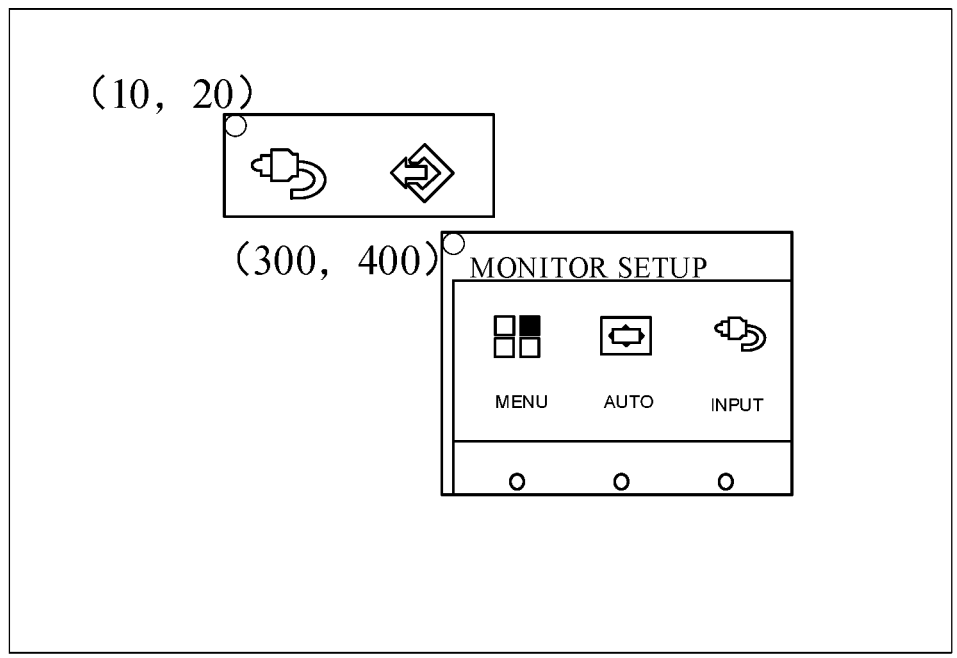
FIG. 11 illustrates a schematic diagram of still another image according to some embodiments of the present disclosure.

FIG. 11 illustrates a schematic diagram of an image 420 according to some embodiments of the present disclosure. As shown in FIG. 11, in response to the training by the training image 400, the second processor 204 may render each of the OSD images at the corresponding position on the combined image 420 according to the known target position information of the OSD images on the combined image.

Figure 12:
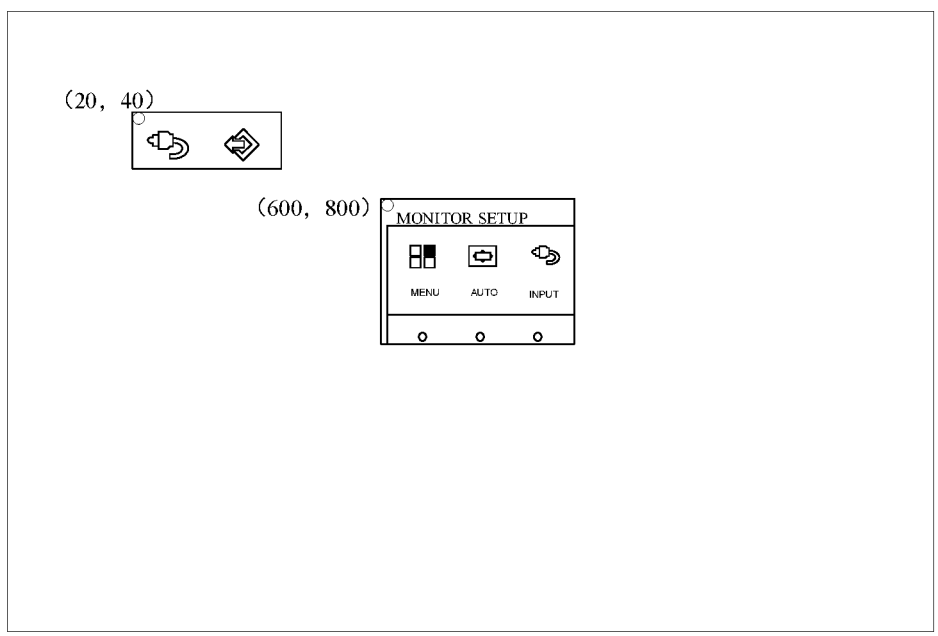
FIG. 12 illustrates a schematic diagram of still another image according to some embodiments of the present disclosure.

FIG. 12 illustrates a schematic diagram of an image 430 according to some embodiments of the present disclosure. Because the training image 400 has been previously trained, the second processor 204 may identify the OSD image from the combined image according to the target position information of the OSD image on the combined image, and the second processor 204 may acquire the second screen 430 by superimposing the OSD images onto the first screen according to the target position information of the OSD image on the first screen (for example, the position of the upper left vertex and the dimension of the OSD image), as shown in FIG. 12.

Accordingly, the process of training, assembling, transmitting, and superimposing the OSD images is completed.

The display device according to the embodiments of the present disclosure divides the combined image into regions. Different regions are configured to transmit different OSD images, and a plurality of OSD images may be transmitted with the same video channel, which does not occupy redundant image transmission channels, but achieves simultaneous transmission and superimposition of different OSD images.

The display device according to the embodiments of the present disclosure solves the problem of requiring a plurality of images transmission channels in the case that a plurality of OSD interfaces need to be superimposed. The display device also solves the problem of failing to display a plurality of OSD images simultaneously (single channel transmission) in the case that a plurality of OSD interfaces need to be superimposed.

Figure 13:
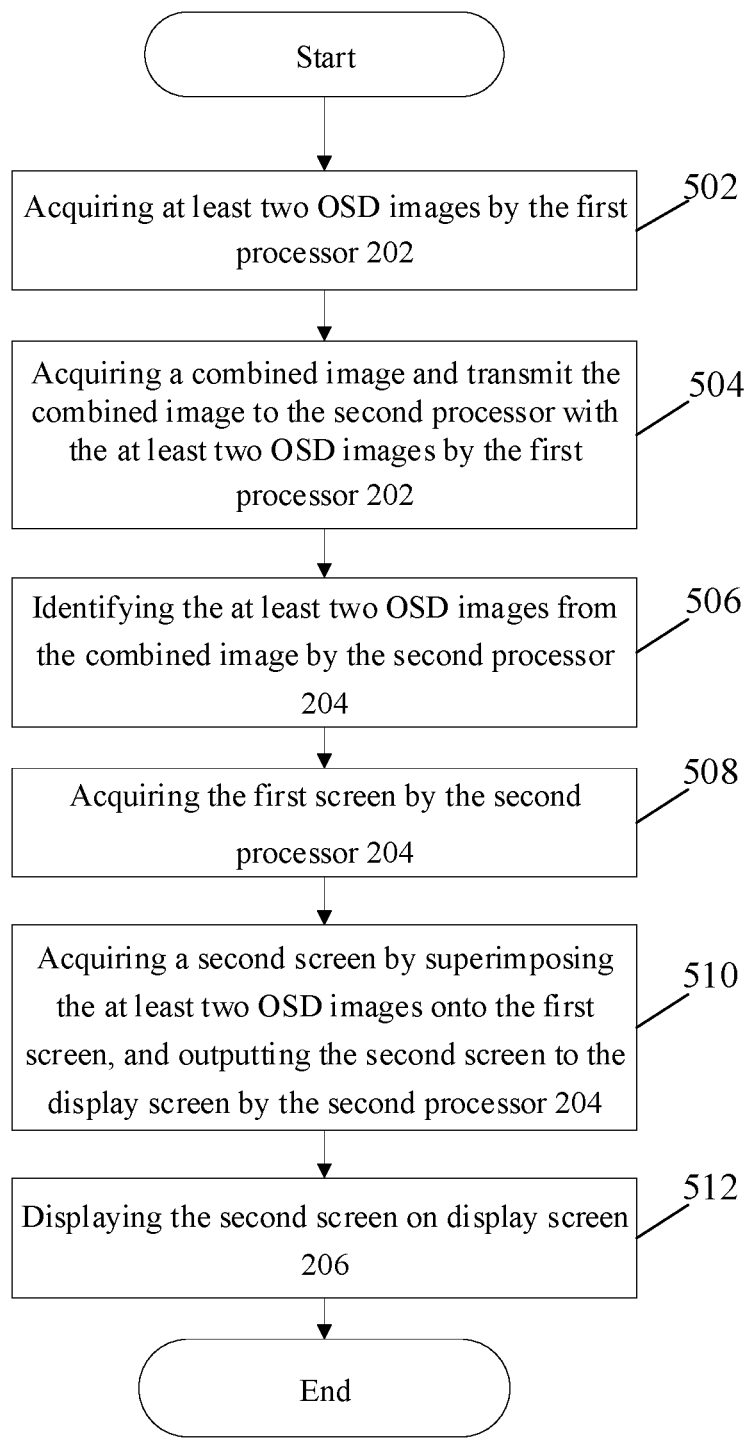
FIG. 13 illustrates a flowchart of a display method according to some embodiments of the present disclosure.

FIG. 13 illustrates a flowchart of a display method 500 according to some embodiments of the present disclosure. As shown in FIG. 13, the display method 500 may be applicable to any of the embodiments or permutations, combinations, and methods of the display device 200, and the display method 500 may include the following processes.

In process 502, the display device 200 acquires at least two OSD images by the first processor 202.

In process 504, the display device 200 forms a combined image and transmits the combined image to the second processor with the at least two OSD images by the first processor 202.

In some embodiments, the combined image may include a mark for identifying the OSD images.

In other examples, the combined image may include no mark configured to identify the OSD images.

In process 506, the display device 200 identifies the at least two OSD images from the combined image by the second processor 204.

In process 508, the display device 200 acquires the first screen by the second processor 204.

In process 510, the display device 200 acquires a second screen by superimposing the at least two OSD images onto the first screen, and outputs the second screen to the display screen by the second processor 204.

In process 512, the display device 200 may display the second screen by the display screen 206.

In some embodiments, the display method further includes: determining the position of each of the OSD images on the combined image and the first screen prior to sending the combined image to the second processor with the first processor, marking the corresponding position information on the target pixel of the combined image according to the position of the combined image and the first screen; identifying the at least two OSD images from the combined image by the second processor includes: identifying the at least two OSD images from the combined image according to the position information; and superimposing the at least two OSD images onto the first screen by the second processor includes: superimposing the at least two OSD images onto the first screen based on the position information.

The relevant content of the position information is described in the above embodiments of the display device, which is not described herein any further.

In some embodiments, the display method 500 further includes:

acquiring the training image corresponding to the combined image by the first processor and sending the training image to the second processor, wherein the training image includes color patch regions corresponding to the OSD images, acquiring the color patch regions and the positions of the color patch regions by identifying the training image by the second processor, and determining target position information of the OSD images on the combined image and the first screen according to the color patch regions and the positions of the color patch regions by the second processor.

In some embodiments, identifying the at least two OSD images from the combined image by the second processor includes: identifying the at least two OSD images from the combined image based on the target position information of the OSD images on the combined image; and superimposing the at least two OSD images onto the first screen by the second processor includes: superimposing the at least two OSD images onto the first screen based on the target position information of the OSD images on the first screen.

The relevant content of the target position information is described in the above embodiments of the display device, which is not described herein any further.

It should be noted that the specific embodiments of the present disclosure are described above. Other embodiments are within the scope of the following claims. In some cases, the actions or processes documented in the claims can be performed in an order different from that in the embodiments and still achieve desirable results. In addition, the processes depicted in the accompanying drawings do not necessarily require the particular order or sequential order shown to achieve desirable results. In some embodiments, multitasking and parallel processing may be possible or advantageous.

It should be understood by those of ordinary skill in the art that the above discussion of any of the above embodiments is exemplary only and is not intended to suggest that the scope of the disclosure (including the claims) is limited to these examples. Within the spirit of the disclosure, the above embodiments, or technical features in different embodiments may also be combined, the processes may be performed in any order, and there are many other variations in different aspects of the present disclosure as described above, which are not provided in detail for the sake of brevity.

Additionally, for simplicity of illustration and discussion, and in order not to obscure the disclosure, well-known power or ground connections to integrated circuit (IC) chips and other components may or may not be shown in the drawings provided. Furthermore, apparatuses may be shown in block diagram form in order to avoid obscuring the present disclosure, and the following facts are also taken into account that the detail regarding implementation of such block diagram apparatuses are highly dependent on the platform on which the present disclosure is to be implemented (i.e., such details should be completely within the understanding of those skilled in the art). Where specific details (for example, circuits) are set forth to describe exemplary embodiments of the present disclosure, it will be apparent to those skilled in the art that the present disclosure may be implemented without these specific details or with variation of these specific details. Therefore, these descriptions should be considered illustrative rather than restrictive.

Although the present disclosure has been described in conjunction with specific embodiments of the present disclosure, based on the foregoing description, many substitutions, modifications and variations of these embodiments are apparent to those of ordinary skill in the art. For example, other memory architectures (for example, dynamic RAM (DRAM)) may use the embodiments discussed.

The disclosure is intended to cover all such substitutions, modifications and variations that fall within the broad scope of the appended claims. Therefore, any omissions, modifications, equivalent substitutions, improvements, and the like made within the spirit and principles of the present disclosure should be included in the protection scope of the present disclosure.

What is claimed is:

1. A display method applicable to a display device, wherein the display device comprises a first processor, a second processor, and a display screen, the second processor being electrically coupled to both the first processor and the display screen;

the display method comprising:
  acquiring at least two on-screen-display (OSD) images by the first processor;
  forming a combined image with the at least two OSD images and sending the combined image to the second processor by the first processor;
  identifying the at least two OSD images from the combined image by the second processor;
  acquiring a first screen by the second processor;
  acquiring a second screen by superimposing the OSD images onto the first screen by the second processor, and outputting the second screen to the display screen; and
  displaying the second screen on the display screen,
  wherein the method further comprising:
  determining a position of each of the OSD images on the combined image and the first screen by the first processor; and
  marking position information on target pixels of the combined image based on the position on the combined image and the first screen by the first processor;
  wherein identifying the at least two OSD images from the combined image by the second processor comprises: identifying the at least two OSD images from the combined image based on the position information; and
  wherein superimposing the at least two OSD images onto the first screen by the second processor comprises: superimposing the at least two OSD images onto the first screen based on the position information.

2. The display method according to claim 1, wherein the combined image comprises a mark for identifying the OSD images.

3. The display method according to claim 1, wherein the position information comprises first information and second information, the first information indicating the positions of the OSD images on the combined image and the second information indicating the positions of the OSD images on the first screen.

4. The display method according to claim 3, wherein
  the first information comprises abscissa information and ordinate information of two diagonal vertices of each of the OSD images on the combined image, the abscissa information and the ordinate information of the two vertices being represented by pixel data of four pixels of the target pixels; and
  the second information comprises abscissa information and ordinate information of one vertex of each of the OSD images on the first screen, the abscissa information and the ordinate information of the one vertex being represented by pixel data of two pixels of the target pixels.

5. The display method according to claim 4, wherein the pixel data comprises a first color component, a second color component, and a third color component, the first color component indicating whether the pixel data comprises available position information, and the second color component and the third color component collectively indicating one of the abscissa information or the ordinate information of the position information.

6. The display method according to claim 1, further comprising:
   acquiring a training image corresponding to the combined image and sending the training image to the second processor by the first processor, wherein the training image comprises color patch regions corresponding to the OSD images;
   acquiring the color path regions and positions of the color patch regions by the second processor by identifying the training image; and
   determining target position information of the OSD images on the combined image and the first screen based on the color patch regions and the positions of the color patch regions by the second processor; and
   wherein identifying the at least two OSD images from the combined image by the second processor comprises: identifying the at least two OSD images from the combined image based on the target position information of the OSD images on the combined image; and
   wherein superimposing the at least two OSD images onto the first screen by the second processor comprises: superimposing the at least two OSD images onto the first screen based on the target position information of the OSD images on the first screen.

7. The display method according to claim 6, wherein the target position information comprises abscissa information and ordinate information of the at least one vertex of each of the OSD images on the combined image and the first screen and length and width of the OSD images;
   wherein the abscissa information and the ordinate information of the vertex on the combined image are in a multiplication relationship with the abscissa information and the ordinate information on the first screen, the multiplication relationship being calculated based on a dimension ratio of the combined image to the first screen.

8. A display device, comprising a first processor, a second processor, and a display screen; wherein
   the first processor is configured to:
   acquire at least two on-screen-display (OSD) images;
   form a combined image with the at least two OSD images; and
   send the combined image to the second processor; and
   the second processor is electrically coupled to the first processor, and is configured to:
   receive the combined image;
   identify the at least two OSD images from the combined image;
   acquire a first screen; and
   acquire a second screen by superimposing the at least two OSD images onto the first screen, and output the second screen to the display screen; and
   the display screen is electrically coupled to the second processor, and is configured to display the second screen,
   wherein the first processor is further configured to: determine a position of each of the OSD images on the combined image and the first screen; and mark position information on target pixels of the combined image based on the position on the combined image and the first screen; and
   wherein the second processor is further configured to: identify the at least two OSD images from the combined image based on the position information; and superimpose the at least two OSD images onto the first screen based on the position information.

9. The display device according to claim 8, wherein the first processor is configured to form the combined image by any one of:
   acquiring the combined image by superimposing the at least two OSD images onto regions corresponding to the at least two OSD images on a background image;
   acquiring the combined image by replacing regions corresponding to the at least two OSD images on the background image with the at least two OSD images; and
   acquiring the combined image by stitching the at least two OSD images.

10. The display device according to claim 8, wherein the OSD images are not overlapped with each other in the combined image.

11. The display device according to claim 8, wherein the first processor is further configured to set a mark on the combined image for identifying the OSD images.

12. The display device according to claim 8, wherein the position information comprises first information and second information, the first information indicating positions of the OSD images on the combined image, and the second information indicating positions of the OSD images on the first screen.

13. The display device according to claim 12, wherein
   the first information comprises abscissa information and ordinate information of two diagonal vertices of each of the OSD images on the combined image, the abscissa information and the ordinate information of the two vertices being represented by pixel data of four pixels of the target pixels; and
   the second information comprises abscissa information and ordinate information of one vertex of each of the OSD images on the first screen, the abscissa information and the ordinate information of the one vertex being represented by pixel data of two pixels of the target pixels.

14. The display device according to claim 13, wherein the pixel data comprises a first color component, a second color component, and a third color component, the first color component indicating whether the pixel data comprises the position information, and the second color component and the third color component collectively indicating one of the abscissa information or the ordinate information of the position information.

15. The display device according to claim 8, wherein the target pixels are a portion of pixels of the first row of pixels of the combined image.

16. The display device according to claim 8, wherein
   the first processor is further configured to acquire a training image corresponding to the combined image and send the training image to the second processor, wherein the training image comprises color patch regions corresponding to the OSD images; and
   the second processor is further configured to: acquire positions of the color patch regions by identifying the training image; and determine target position information of the OSD images on the combined image and the first screen based on the positions of the color patch regions.

17. The display device according to claim 16, wherein the first processor is configured to form the combined image with the at least two OSD images based on the target position information of the OSD images on the combined image; and wherein the second processor is configured to: identify the at least two OSD images from the combined image based on the target position information of the OSD images on the combined image; and superimpose the at least two OSD images onto the first screen based on the target position information of the OSD images on the first screen.

18. The display device according to claim 17, wherein the target position information comprises abscissa information and ordinate information of at least one vertex of each of the OSD images on the combined image and the first screen and length and width of the OSD images;

wherein the abscissa information and the ordinate information of the vertex on the combined image are in a multiplication relationship with the abscissa information and the ordinate information on the first screen, the multiplication relationship being calculated based on a dimension ratio of the combined image to the first screen.

* * * * *